Figure 1:
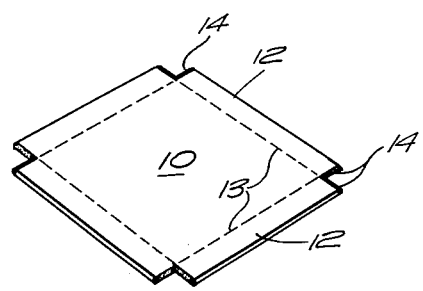

Nov. 28, 1961 C. A. GOVATSOS 3,010,639
BEADED BOX BLANK AND BEAD-SEALED BOX
Filed July 30, 1958 3 Sheets-Sheet 1

INVENTOR.
CHARLES A. GOVATSOS
BY
KENWAY, JENNEY, WITTER & HILDRETH
ATTORNEYS

Nov. 28, 1961

C. A. GOVATSOS 3,010,639

BEADED BOX BLANK AND BEAD-SEALED BOX

Filed July 30, 1958

3 Sheets-Sheet 2

INVENTOR.
CHARLES A. GOVATSOS
BY
KENWAY, JENNEY, WITTER & HILDRETH

ATTORNEYS

Nov. 28, 1961  C. A. GOVATSOS  3,010,639
BEADED BOX BLANK AND BEAD-SEALED BOX
Filed July 30, 1958  3 Sheets-Sheet 3

*INVENTOR.*
CHARLES A. GOVATSOS
BY
KENWAY, JENNEY, WITTER & HILDRETH

ATTORNEYS

United States Patent Office 3,010,639
Patented Nov. 28, 1961

3,010,639
BEADED BOX BLANK AND BEAD-SEALED BOX
Charles A. Govatsos, 123 Russell Road,
West Newton, Mass.
Filed July 30, 1958, Ser. No. 751,952
2 Claims. (Cl. 229—48)

This invention relates to paperboard box blanks and boxes together with a novel method of constructing and sealing the same. In accordance with my invention the blanks are cut to a size and shape to form the body and side panels of the box desired and beads of sealing material adapted thereafter to adhesively join such edges together are bonded to marginal edges of the panels. The production of a novel method of thus constructing box blanks and sealing the panels thereof together to form and adhesively seal boxes formed therefrom comprises a primary object of the invention.

The invention relates more particularly to box blanks foldable on crease lines to box form. Such foldable blanks have heretofore been constructed in various forms, including glue flaps, tuck flaps, creased and folded side wall panels, etc. for supporting the side walls of the box, or the box corners have been secured by tapes, staples and like fastening means. The primary function of all such corner and closure structures is to support the side walls in box formation and the tightness of these corner closures varies considerably from zero to substantially less than a complete sealing of the box at such joints. Also the appearance and support provided are frequently unattractive and inadequate. An important object of my invention resides in the production of a new and improved foldable blank and box wherein these objectionable features are wholly eliminated and a complete and attractive sealing of the box is effected at the sealing joints.

The blanks and boxes of my invention have no folded or overlapping walls or flaps and when sealed in accordance with the invention the junction joints between cooperating walls are tightly sealed together against the passage of moisture into the box or into or through the walls. The blanks are constructed with beads of sealing material on and bonded to the edges to be joined and when the blanks are folded to box form these beads are merged to complete the junction and form a perfect and attractive sealing together of the cooperating walls. The blanks are furthermore constructed in flat form adaptable to be rapidly set up and sealed by machine operations, all as hereinafter more specifically described.

The invention is particularly applicable to the packaging of products to be frozen in the package since the joined walls of the box provide a complete watertight container and after the product has been packed within the box a cover is sealed thereon by the sealing beads provided by my invention. The goods are thus completely enclosed and sealed within the walls of the container without the requirement of additional fastening means or overlaps. The production of a novel blank and box of the nature herein described, together with my novel method of sealing the same at the junction joints, comprises a further object of the invention.

These and other features of the invention will be best understood and appreciated from the following description of preferred embodiments thereof selected for purposes of illustration and shown in the accompanying drawings in which—

Figure 2:
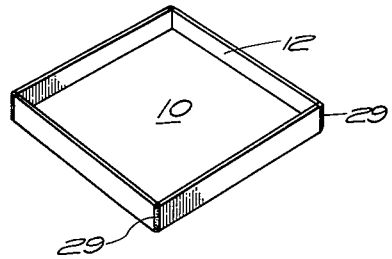
Figure 3:
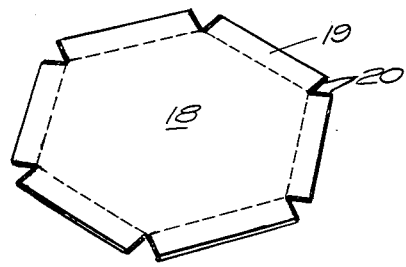
Figure 4:
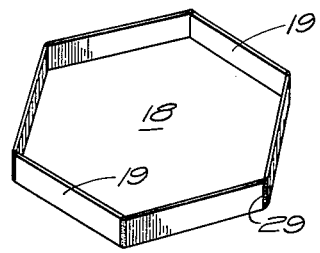
Figure 5:
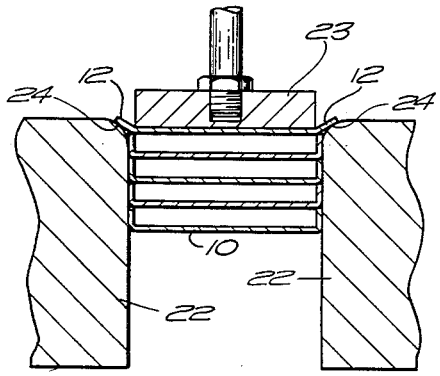
Figure 6:
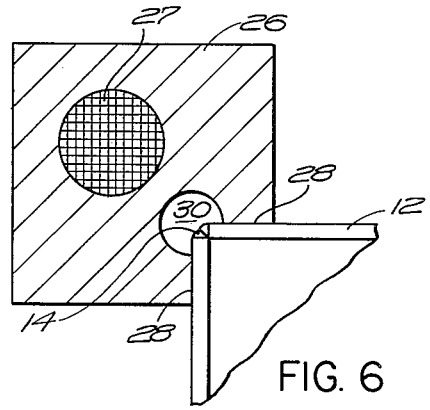
Figure 10:
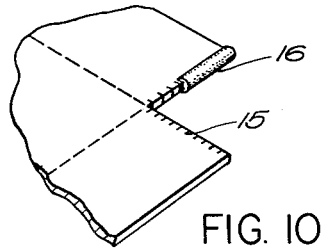
Figure 11:
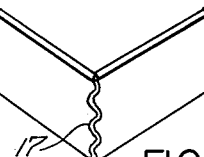
Figure 12:
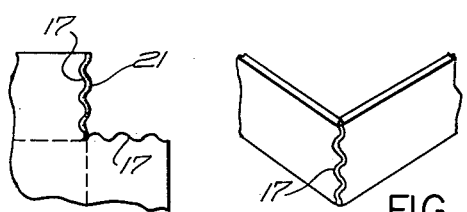
Figure 13:
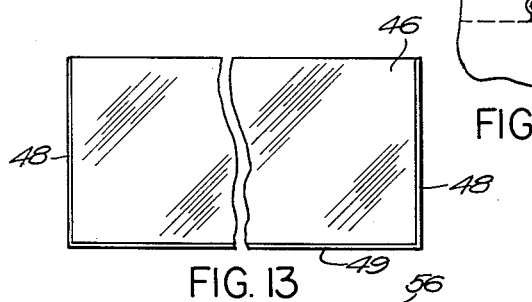
Figure 14:
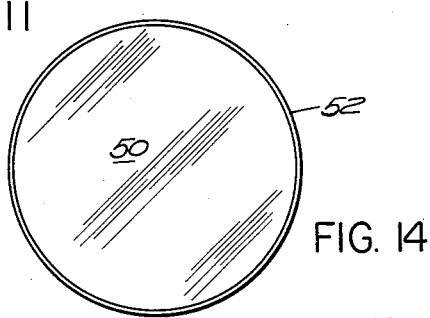
Figure 15:
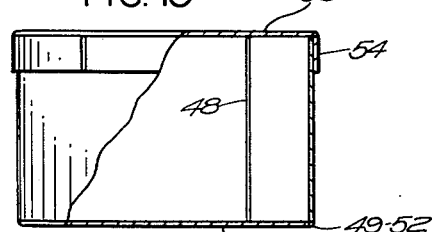
Figure 16:
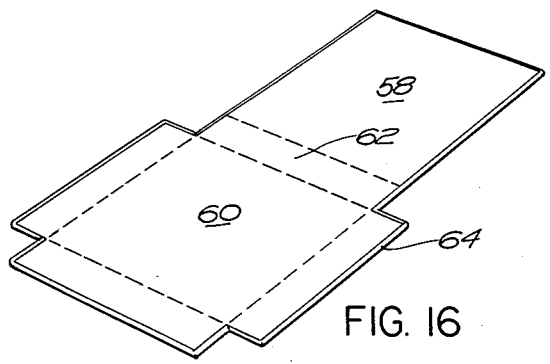
Figure 19:
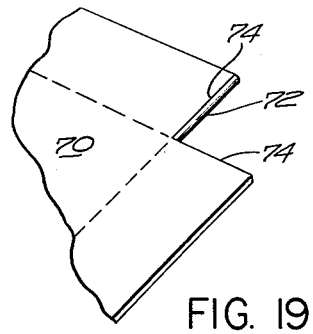
Figure 17:
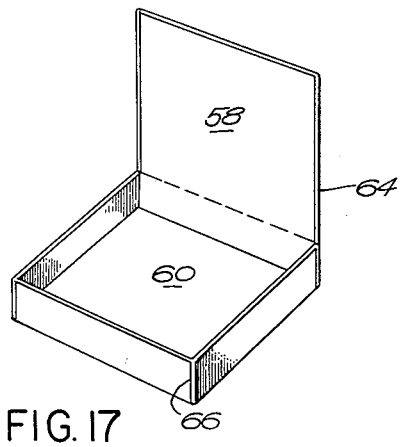
Figure 20:
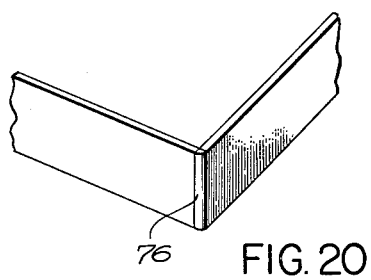
Figure 18:
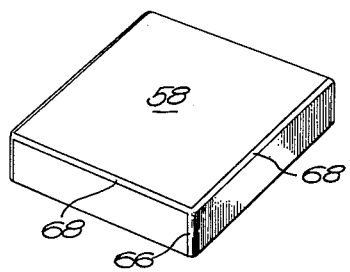

FIG. 1 is a perspective view of a blank embodying the invention,
FIG. 2 illustrates the blank set up to tray or box form,
FIGS. 3 and 4 are like FIGS. 1 and 2 but illustrate a blank and box of another shape.
FIG. 5 is a fragmentary vertical sectional view of mechanism for setting up the blanks to box form,
FIG. 6 is an enlarged fragmentary view illustrating the sealing of the corner joint of a box shown in FIG. 5,
FIGS. 7, 8 and 9 are like views showing modified forms of sealing mechanism,
FIG. 10 illustrates the corner of a blank treated in accordance with a further feature of the invention,
FIG. 11 illustrates a modified blank corner,
FIG. 12 illustrates the FIG. 11 blank corner set up to box form,
FIG. 13 illustrates a rectangular paperboard blank employed for constructing the side wall of a round box,
FIG. 14 is a round blank adapted to provide the bottom wall of the box,
FIG. 15 illustrates a round box and cover formed from blanks of the nature shown in FIGS. 13 and 14,
FIG. 16 is a perspective view of a box blank including a cover panel,
FIG. 17 illustrates the blank set up to open box form,
FIG. 18 illustrates the box completely sealed,
FIG. 19 is a fragmentary view of a further modified blank corner construction, and
FIG. 20 illustrates this corner construction set up to box form.

In FIG. 1 I have illustrated a simple blank of square or rectangular configuration constructed in accordance with the invention and comprising a bottom panel 10 and side wall panels 12 integrally connected along score lines 13. The panels 12 are adapted to be folded upwardly on the lines 13 to form the tray or box shown in FIG. 2. When the side panels are thus folded their complementary end edges are brought into juxtaposed relation at the corners of the box and are sealed together in accordance with my invention.

As illustrated in FIG. 1 I provide beads 14 of sealing material on and bonded to the end margins of the panels 12 and the complementary beads at each corner are brought into juxtaposed relation when the panels 12 are raised to the box forming position of FIG. 2. The beads are adhesively bonded to and completely seal the end margins of the panels against the passage of moisture or other fluids. The blank can be constructed of such character of paperboard as meets the requirement for which the box is to be used, such as plane, corrugated, waterproof, etc., and if desired the edges can be serrated as indicated at 15 in FIG. 10 to facilitate the absorbing and complete sealing by the sealing material when the bead is applied as indicated at 16. Cooperating edges can also be of such shape as seem desirable, such as the interlocking margins 17 shown in FIGS. 11 and 12 and including a sealing bead 21. In FIGS. 3 and 4 I have illustrated a hexagonal blank and tray embodying a bottom panel 18, integral side wall panels 19 and sealing beads 20, and it will be understood that the invention contemplates such other shapes as may be required.

The beads of sealing material can be applied to the marginal edges of the blanks by extrusion of the material onto and along the edges or by such other means and method as seen most suitable. The beaded blanks are shipped in flat and stacked condition to the consumer and are adapted to be set up as and when used. The setting up operation contemplated comprises merely the forcing of the blank through a setting up die adapted to fold the side panels upwardly to the position shown in FIGS. 2 and 4. In FIG. 5 I have illustrated a relatively deep die 22 adapted to receive and support a plurality of trays. A plunger 23 is disposed to engage the bottom panel 10 of the blank and force the blank into the die. The side panels 12 are thereupon folded upwardly by contact with the rounded margins 24 of the die. The opening through the die corresponds in size and shape to the panel 10 whereby each formed tray contacts the walls 12 of the tray therebeneath, thereby progressively forcing the stacked trays downwardly through the die.

As each blank 10 is forced into the die, its side panels 12 are raised to a vertical position bringing their beaded ends 14 into juxtaposed relation and the invention contemplates the sealing of these ends together by the bead material as the trays pass through the die. During this passage the beads are subjected to a treatment causing them to merge and form a complete corner seal at each corner of the tray. The bead material is preferably of a thermoplastic nature adapted to melt and merge upon the application of heat thereto. It is also contemplated that other types of sealing material that can be employed include a solvent type adhesive, an emulsion type, and a two-phase system, and possibly reinforced with fibre glass or some similar reinforcing materials to give strength.

Figure 7:
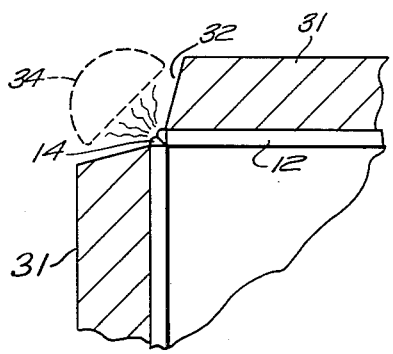

In FIGS. 6-9 I have illustrated proposed heating means for melting and merging the beads as the trays pass through the dies. In FIG. 6 I have shown a metal block 26, one such block being provided at each corner of the die. The block is heated by a cartridge type electric heater 27 therein and is constructed to engage the side panels 12 at 28 adjacent to the beads 14. As the tray passes through the die heat is transmitted to the beads by radiation across a gap 30 in the block and by conduction from the contacts at 28. The beads are thus melted sufficiently to flow and merge into a complete seal 29 (FIG. 2) at each corner of the tray. In FIG. 7 the die 31 is illustrated as cut away at each corner 32 to expose the tray beads 14 to radiant heat from a heater 34. As the trays pass through the die this heat softens the beads which thereupon merge and form the corner seals 29 shown in FIGS. 2 and 4.

Figure 8:
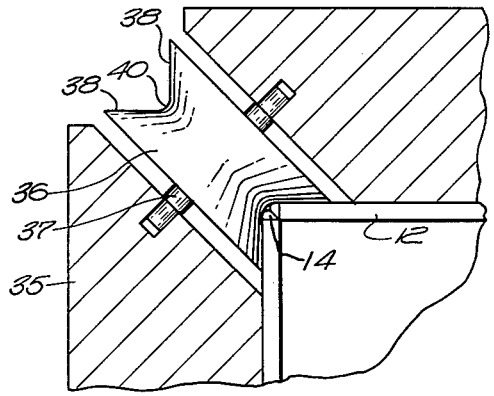
Figure 9:
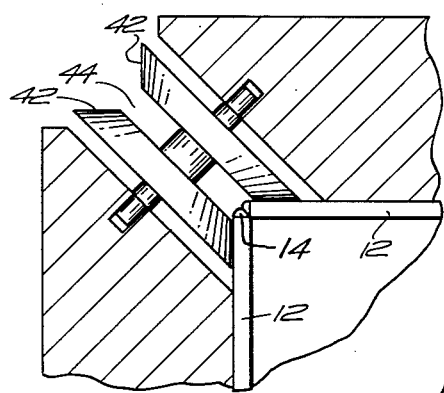

In FIG. 8 I have illustrated the die 35 as carrying a sealing roller 36 at each corner. Each roller is rotatably mounted in the die and positioned to contact opposing bevels 38 against the corner portions of the panels 12. The rollers are heated, as by electric coils disposed in the axles 37, and the junction 40 of the two bevels 38 is disposed to contact the beads 14 and mold them to desired contour as the beads pass into contact with the rollers. It may in some cases be desirable not to mold the beads and in FIG. 9 I have illustrated the heated rollers 42 as spaced apart to provide a bead receiving gap 44 therebetween. If additional heating preliminary to contact by the rollers is required it may be desirable to combine the radiant heaters of FIG. 7 with the rollers of FIGS. 8 and 9. It will also be apparent that the bevels 38 and 42 serve to snug the panels 12 into tight contact at the corners and thus aid in effecting the seal.

The invention is applicable to blanks and boxes of shapes other than those above described and in FIGS. 13-15 I have illustrated the construction of a round box and cover by the employment of my invention. In this case the side wall of the box is constructed from a rectangular blank 46 provided with beads 48 and 49 of sealing material on its ends and bottom margins. The bottom of the box is formed from a disk 50 provided with a bead 52 of sealing material at its margin. In assembling the blanks 46 and 50 the blank 46 is brought to tubular form and the end beads 48 are sealed together providing the tubular side wall of the box. The beads 49 and 52 are then sealed together in like manner to secure the disk 50 to the bottom margin of the tubular side wall. The cover is formed in like manner from a rectangular strip 54 and a top forming disk 56.

The invention is particularly applicable to the packaging of products to be frozen in the package and in such case the tray (FIGS. 2 and 4) is provided with a top closure panel adapted to be sealed to the tray following the packing of the product thereinto. This blank is preferably constructed as shown in FIG. 16 and includes a cover panel 58 corresponding in size and shape to the bottom panel 60 and integral with a side panel 62. A bead 64 of sealing material is applied to the entire perimeter of the blank and the open box is set up to the form shown in FIG. 17 and sealed at the corners 66 in the manner above described in reference to FIGS. 1 and 2. When the box has been packed with the product the cover panel 58 is closed and sealed to the side walls at 68 to provide the fully sealed package illustrated in FIG. 18.

While both complementary margins of each pair of edges to be sealed together are preferably provided with beads of sealing material, as above illustrated and described, it is possible that in some cases it may be desirable to provide a sealing bead only on one of each of such pair of edges, and in FIG. 19 I have illustrated the corner of a blank 70 as provided with such a bead 72 on only one of the two complementary edges 74. When the blank is folded to box form and these two edges are brought into juxtaposed relation, they are adhesively joined and bonded together by softening the bead 72 and molding it into a single bead 76 bonded to both edges, as illustrated in FIG. 20.

The invention comprises the production of flat box blanks having marginal edges adapted to be juxtaposed in a relation forming the blanks into trays or boxes when such edges are sealed together, and in the production of such blanks with sealing material bonded onto and along the marginal edges in position to seal the edges together when the edges are juxtaposed and the sealing material softened and merged as hereinabove described. It will be apparent that the amount and character of the sealing material required at the marginal edges will vary in accordnace with the viscosity and other characteristics of the sealing material composition, the thickness of paperboard used and other requirements. In some cases a light coating may be sufficient whereas other cases may require a heavier application of sealing material. In any event such material will be bonded onto and along the edges to be joined and, for purposes of illustration and description only, I have herein conveniently referred to these coatings as "beads" of sealing material. It will also be understood that such "beads" are shown in somewhat exaggerated thickness in the drawings for illustrative purposes only and without any intendion of limitation.

Having thus disclosed my invention what I claim as new and desire to secure by Letters Patent is:

1. A flat paperboard box blank embodying a bottom panel having relatively adjacent side forming panels projecting outwardly therefrom and integral therewith along scored junction lines, and beads of thermoplastic sealing material on and bonded to and along the end margins of the side forming panels, the adjacent beads being adapted to be brought into parallel and abutting juxtaposed relation when the side panels are raised to upright position about said score lines and the raised side panels being adapted to be adhesively joined by merging the juxtaposed beads into coalescence.

2. The blank defined in claim 2 plus a top panel commensurate in size and shape to said bottom panel and integral with one of said side forming panels along a margin thereof opposite to the bottom panel, and beads of sealing material on and bonded to and along the marginal edges of the top panel and side panels for sealing such panels together at said edges.

References Cited in the file of this patent

UNITED STATES PATENTS

| | | |
|---|---|---|
| 88,165 | Hendryx | Mar. 23, 1869 |
| 663,134 | Simon | Dec. 4, 1900 |
| 672,275 | Leighton | Apr. 16, 1901 |
| 2,252,779 | Moore | Aug. 19, 1941 |
| 2,367,725 | Lindh et al. | Jan. 23, 1945 |
| 2,392,734 | Haberstump | Jan. 8, 1946 |
| 2,550,520 | Bennett | Apr. 24, 1951 |
| 2,665,616 | Jungmayr | Jan. 12, 1954 |
| 2,669,914 | Swaine | Feb. 23, 1954 |
| 2,706,592 | Schaller | Apr. 19, 1955 |
| 2,808,976 | Chaplin | Oct. 8, 1957 |
| 2,820,584 | Hendry | Jan. 21, 1958 |
| 2,848,151 | O'Neil | Aug. 19, 1958 |
| 2,932,439 | Sparling | Apr. 12, 1960 |